US012693942B1

(12) United States Patent
Acharya et al.

(10) Patent No.: US 12,693,942 B1
(45) Date of Patent: Jul. 28, 2026

(54) INTELLIGENT DYNAMIC PROTECTION FOR DELETED VIRTUAL MACHINES

(71) Applicant: Dell Products L.P., Round Rock, TX (US)

(72) Inventors: Prakash Appayya Acharya, Bangalore (IN); Sharath Talkad Srinivasan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 19/070,760

(22) Filed: Mar. 5, 2025

(51) Int. Cl.
    *G06F 11/00*     (2006.01)
    *G06F 11/1446*     (2026.01)

(52) U.S. Cl.
    CPC ...... *G06F 11/1469* (2013.01); *G06F 11/1451* (2013.01); *G06F 11/1464* (2013.01)

(58) Field of Classification Search
    CPC ............. G06F 11/1469; G06F 11/1451; G06F 11/1464
    See application file for complete search history.

(56) References Cited

U.S. PATENT DOCUMENTS

| | | | |
|---|---|---|---|
| 10,908,835 B1 * | 2/2021 | Patel | ..................... G06F 3/0619 |
| 2022/0374519 A1 * | 11/2022 | Botelho | .............. G06F 11/1464 |

* cited by examiner

*Primary Examiner* — Jason B Bryan

(74) *Attorney, Agent, or Firm* — Dergosits & Noah LLP; Todd A. Noah

(57) ABSTRACT

A system detects a switch off event sent by a virtual machine management server, and identifies a virtual machine that is tagged by the switch off event and protected by a data protection server, and applies a deletion lock to the virtual machine. The system detects a deletion event sent by the virtual machine management server, and identifies a virtual machine that is tagged by the switch off event, protected by the data protection server, and tagged by the deletion event. The system creates a backup file for the virtual machine that is tagged by the deletion event. The system releases the deletion lock from protecting the virtual machine that is tagged by the deletion event. If the deletion event was accidental or malicious, the system uses the backup file to restore the virtual machine which was deleted by the deletion event after the release of the deletion lock.

20 Claims, 4 Drawing Sheets

INTELLIGENT DYNAMIC PROTECTION FOR DELETED VIRTUAL MACHINES

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application performs a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to perform a restore operation to restore a copy of the corresponding backup file(s) for that previous state to the data object.

A data object may be created, read, updated, and deleted by a virtual machine, which can be a software implementation of a computer, and which can emulate a specific physical computer by being based on the computer architecture of the specific physical computer, and therefore can provide the functionality of the specific physical computer by executing programs like the specific physical computer executes programs. A host of multiple instances of virtual machines leads to more efficient use of computing resources, both in terms of energy consumption and cost effectiveness, known as hardware virtualization, the key to a cloud computing environment. A virtual machine center can use a virtual machine monitor to create virtual machine environments on multiple computers systems, each of which can function as a host of multiple virtual machines.

Similar to other data sets, backup/restore applications make copies of a virtual machine's data set and store these copies as backup files that enable the backup/restore application to restore the virtual machine's data set in the event of a corruption, an erroneous update, or an inadvertent or malicious deletion of the virtual machine's data set. A data protection server may be scheduled to protect virtual machines by periodically creating backup files that contain each virtual machine's data set. For example, a data protection server may schedule its backup/restore application to create at least one backup file corresponding to each virtual machine in a production environment each Saturday night at midnight.

Virtual machines (some of which may be protected by a data protection server) in a production environment may be deleted dues to many reasons, such as a scheduled or an accidental deletion via a User Interface or a Command Line Interface as part of any automation script in the production environment, or a malicious deletion via a security breach event, such as a malicious actor acquiring a system administrator's confidential access information (e.g., user name and password). These accidental and malicious deletions may create a data loss resulting in significant increase in the Recovery Point Objective. For example, after a weekly backup file is created for a virtual machine on Saturday night at midnight, the virtual machine is accidentally deleted by a relatively inexperienced user via a user interface following Thursday night at midnight. In this situation, the data protection server can restore the virtual machine to the latest backed up instance of the data state from five days ago on the previous Saturday night at midnight, which is not to its latest state on the current Thursday night at midnight just before deletion, thereby resulting in the loss of the deleted virtual machine's most recent five days of data. For this example, there is no way to restore the deleted virtual machine to its latest state on Thursday might at midnight just before the virtual machine was deleted.

DETAILED DESCRIPTION

Figure 1:
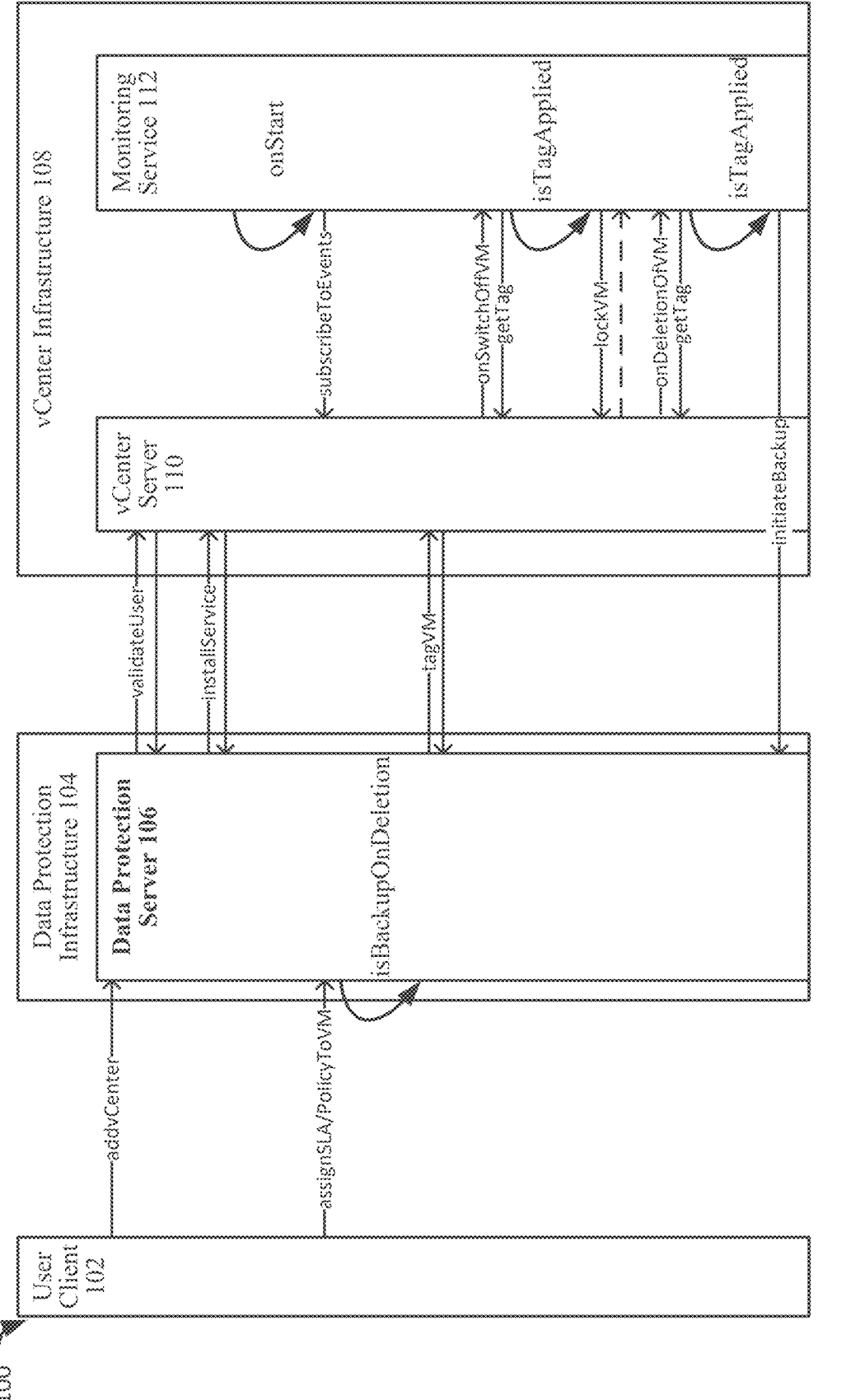
FIG. 1 illustrates a block diagram of an example of sequence diagram for intelligent dynamic protection of deleted virtual machines, under an embodiment.

Embodiments provide intelligent dynamic protection of deleted virtual machines. A system detects a switch off event sent by a virtual machine management server, and identifies a virtual machine that is tagged by the switch off event and protected by a data protection server. The system applies a deletion lock to the virtual machine that is tagged by the switch off event and is protected by the data protection server. The system detects a deletion event sent by the virtual machine management server, and identifies a virtual machine that is tagged by the switch off event, protected by the data protection server, and tagged by the deletion event. The system creates a backup file for the virtual machine that is tagged by the deletion event. The system releases the deletion lock from protecting the virtual machine that is tagged by the deletion event. If the deletion event was accidental or malicious, the system uses the backup file to restore the virtual machine, which was deleted by the deletion event after the release of the deletion lock.

For example, a monitoring service detects a switch off event sent by a vCenter server, because the monitoring service subscribes to an event trigger created for the vCenter server's switch off event for protected virtual machines, and gets a tag XYZ which is the name given to the $2^{nd}$ host's $2^{nd}$ virtual machine, which is tagged by the switch off event and which was configured via a Service Level Agreement to be protected by a backup/restore application each Saturday night at midnight. The monitoring service applies a deletion lock to the XYZ virtual machine. The monitoring service detects a deletion event sent by the vCenter server because the monitoring service subscribes to an event trigger created for the vCenter server's deletion event for protected virtual machines, and gets the tag XYZ for the $2^{nd}$ host's $2^{nd}$ virtual machine, which is tagged by the deletion event. The monitoring service initiates a backup/restore application to create a backup file for the XYZ virtual machine that is tagged by the deletion event, and after the backup file is created, releases the deletion lock from protecting the XYZ virtual machine that is tagged by the deletion event. Upon determining that the deletion event was accidental, the monitoring service initiates the backup/restore application to use the backup file created on Thursday night at midnight to restore the XYZ virtual machine that was deleted on Thursday night at midnight after the release of the deletion lock, to the state of the XYZ virtual machine on Thursday night at midnight.

The system can protect a virtual machine one last time before the protected virtual machine is deleted, eliminate data loss scenarios, and reduce the Recovery Point Objective to zero. The system can intelligently detect the protected virtual machines in a vCenter environment, track the events on the protected virtual machines, and dynamically take decisions based on the occurrence of specific events on the virtual machines to initiate ad hoc protection of the virtual machines.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "an embodiment" or "the embodiment" in various places in the specification do not necessarily all refer to the same embodiment.

FIG. 1 illustrates a block diagram of an example of sequence diagram 100 for intelligent dynamic protection of deleted virtual machines, under an embodiment. The sequence diagram 100 includes a user client (computer) 102, a data protection infrastructure 104 that includes a data protection server 106, and a vCenter Infrastructure 108 that includes both a vCenter server 110 and a monitoring service 112. The user client 102 configures the vCenter server 110 as an added asset source in the data protection server 104, which responds by requesting validation of the user client 102 by the vCenter server 110. If the vCenter server 110 validates the user client 102, the data protection server 106 responds by pushing a light-weight monitoring service installer to the vCenter server 110, and the light-weight monitoring service installer installs the monitoring service 112 in the vCenter infrastructure 108 to monitor the vCenter server 110.

On startup, the monitoring service 112 registers or subscribes to monitor the events of the vCenter server 110 for protected virtual machines. Next, the user client 102 configures a Service Level Agreement/Policy in the data protection server 106 for virtual machine backup on deletion, and tags each of the protected virtual machines with a unique identifier. The data protection server 106 sends these tags to the vCenter server 110, which confirms receipt of these tags. The monitoring service 112 enlists the tags of the protected virtual machines from the vCenter server 110, and creates an event trigger which can monitor for events such as switch off, shut down, and deletion, and also alarms and actions.

Upon dynamically detecting the trigger of a switch off event by the vCenter server 110, the monitoring service 112 which subscribes to this event gets the tag for the virtual machine corresponding to the switch off event from the vCenter server 110. If this tag is applied to a virtual machine that a Service Level Agreement/Policy is protecting from deletion, the monitoring service 112 uses the tag to apply the deletion lock to the protected virtual machine, which prevents deletion of the protected virtual machine so the virtual machine temporarily cannot be deleted. Upon dynamically detecting the trigger of a deletion event sent by the vCenter server 110, the monitoring service 112 which subscribes to this event gets the tag for the virtual machine corresponding to the deletion event from the vCenter server 110. If this tag is applied to a virtual machine that a Service Level Agreement/Policy is protecting from deletion, the monitoring service 112 uses the tag to initiate a backup that provides an ad hoc protection of the tagged virtual machine by invoking a data protection Application Programming Interface via the data protection server 106.

After verifying that the data protection server 106 completes creation of at least one backup file which successfully protects the virtual machine, the monitoring service 112 releases the deletion lock from the virtual machine, which enables the deletion of the virtual machine, as per the still pending request. The deletion lock will be released immediately after the virtual machine is "powered on." This prevents the virtual machines from deletion immediately after the virtual machines are switched off, protects each virtual machine to its latest state, and prevents any data loss on the virtual machines. Each of the protected virtual machines which may be deleted from the production environment is provided a zero data loss up until the time of the virtual machine deletion, which is not specific to the virtual machine backup schedule. A virtual machine is restored to the point in time of the deletion of the virtual machine.

Figure 2:
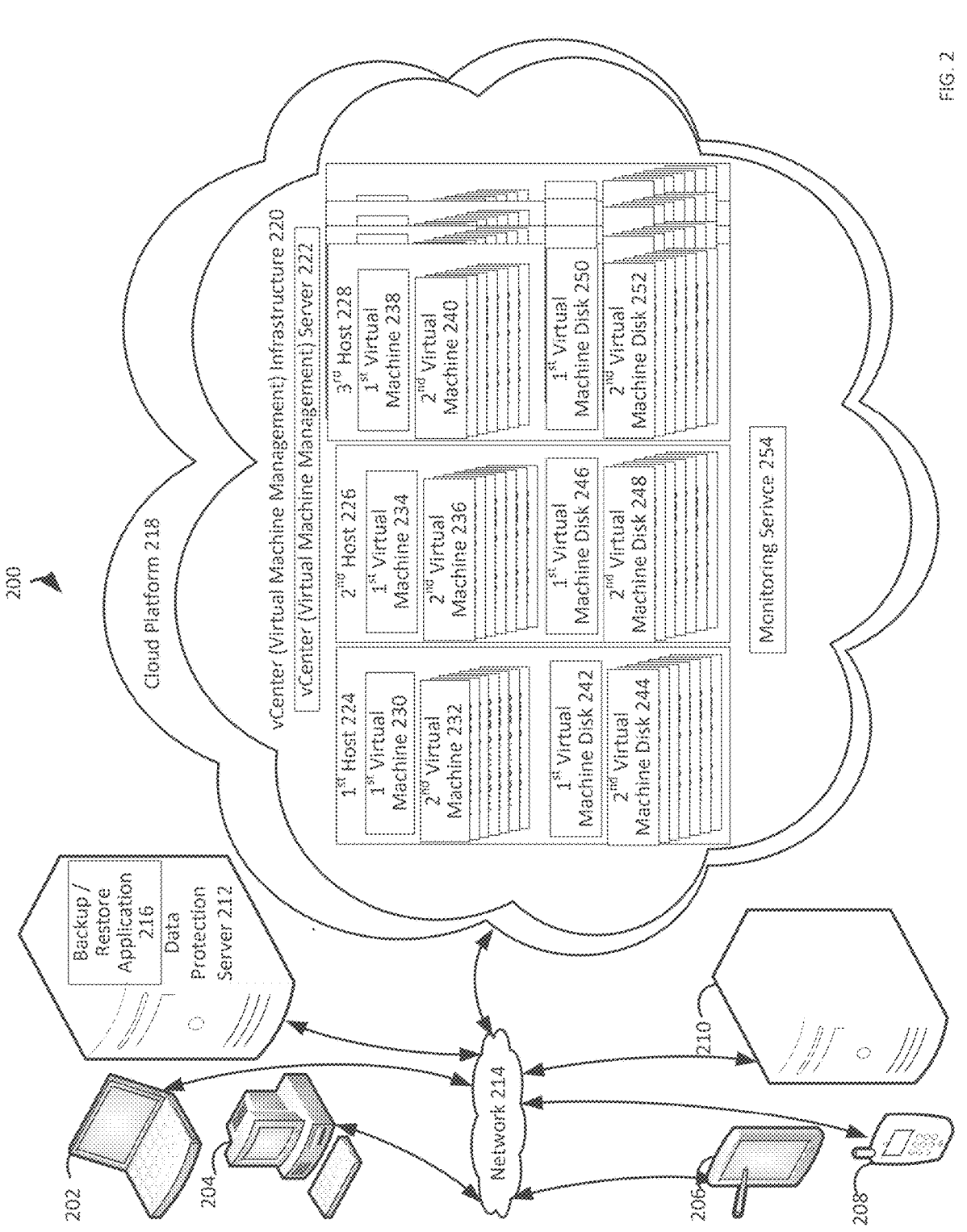
FIG. 2 illustrates a block diagram of an example system which provides intelligent dynamic protection of deleted virtual machines, under an embodiment.

FIG. 2 illustrates a diagram of a system 200 for intelligent dynamic protection of deleted virtual machines. As shown in FIG. 2, the system 200 may illustrate a cloud computing environment in which data, applications, services, and other application resources are stored and delivered through shared data centers and appear as a single point of access for the users. The system 200 may also represent any other type of distributed computer network environment in which servers control the storage and distribution of application resources and services for different client users.

In an embodiment, the system 200 represents a cloud computing system that includes a first client 202, a second client 204, a third client 206; a fourth client 208; a fifth client 210, and a data protection server 212. The first client 202 may be a laptop computer 202, the second client 204 may be a desktop computer 204, the third client 206 may be a tablet computer 206, the fourth client 208 may be a smart phone 208, and the fifth client 210 may be a server 210. The clients 202-210 and the data protection server 212 communicate via a network 214, and the data protection server 212 includes a backup/restore application 216. FIG. 2 depicts the system 200 with five clients 202-210, one server 212, one network 214, and one backup/restore application 216, but the system 200 may include any number of each of the clients 202-210, the server 212, the network 214, and the backup/restore application 216.

The data protection server 212 also communities via the network 214 with a cloud platform 218, which includes a virtual machine management infrastructure 220, which comprises a virtual machine management server 222 that manages any number of hosts, such as the hosts 224, 226, and 228, each of which may host any number of virtual machines. Although FIG. 2 depicts the first host 224 as hosting a first virtual machine 230 and a second virtual machine 232, the second host 226 as hosting a first virtual machine 234 and a second virtual machine 236, and the third host 228 as hosting a first virtual machine 238 and a second virtual machine 240, each of the hosts 224, 226, and 228 may host any number of virtual machines. Any of the virtual machines 230-240 may be a Linux virtual machine, a Windows virtual machine, or any other type of suitable virtual machine.

A virtual machine usually emulates an existing architecture, including disks. For example, the first virtual machine 230 and the second virtual machine 232 hosted by the first host 224 correspond to a first virtual machine disk 242 and second virtual machine disk 244 hosted by the first host 224, the first virtual machine 234 and the second virtual machine 236 hosted by the second host 226 correspond to a first virtual machine disk 246 and a second virtual machine disk 248 hosted by the second host 226. and the first virtual machine 238 and the second virtual machine 240 hosted by the third host 228 correspond to a first virtual machine disk 250 and a second virtual machine disk 252 hosted by the third host 228. Although FIG. 2 depicts the first host 224 as hosting a first virtual machine disk 242 and a second virtual machine disk 244, the second host 226 as hosting a first virtual machine disk 246 and a second virtual machine disk 248, and the third host 228 as hosting a first virtual machine disk 250 and a second virtual machine disk 252, each of the hosts 224, 226, and 228 may host any number of virtual machines disks. A backup copy of any of the virtual machines 230-240 may be created by creating a backup copy of the virtual machines 230-240 and/or the corresponding virtual machine disks 242-252, which store the corresponding data sets. Each of the hosts 224-228, virtual machines 230-240, and virtual machine disks 242-252 may be monitored by a monitoring service 254.

Figure 3:
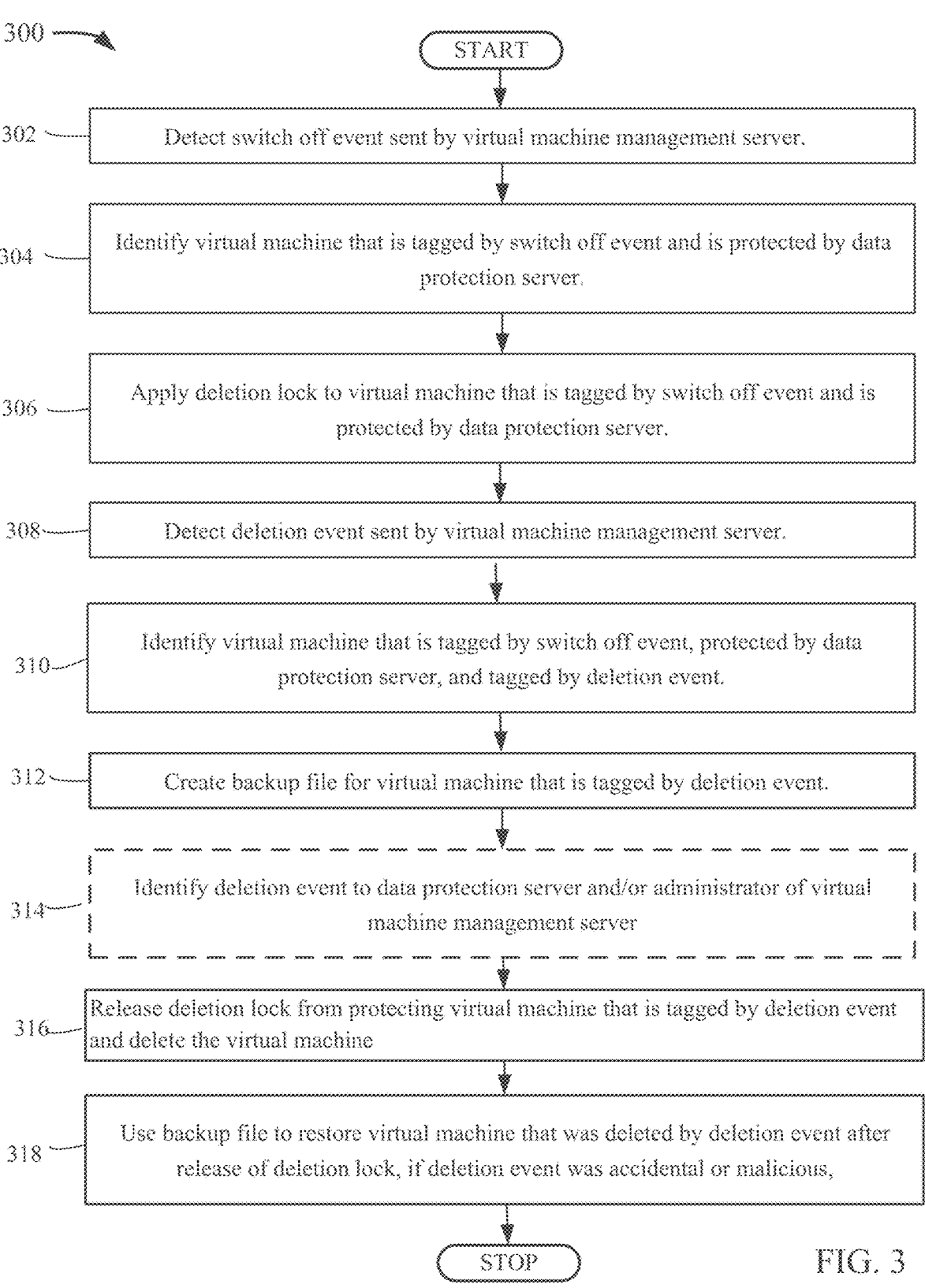
FIG. 3 is a flowchart that illustrates an example method which provides intelligent dynamic protection of deleted virtual machines, under an embodiment.

FIG. 3 is a flowchart 300 that illustrates a method for intelligent dynamic protection of deleted virtual machines. Flowchart 300 depicts method acts illustrated as flowchart blocks for certain steps involved in the clients 202-210, the data protection server 212, the network 214, the backup/restore application 216, the virtual machine management server 222, the hosts, their virtual machines 224-240, their virtual machines disks 242-252, and/or the monitoring service 254 of FIG. 2.

A switch off event is detected as being sent by a virtual machine management server, block 302. A system detects switch off events, which are used to switch off a virtual machine before the virtual machine can be deleted. For example, and without limitation, this can include the monitoring service 254 detecting a switch off event sent by the vCenter server 220, because the monitoring service 254 subscribes to an event trigger created for the vCenter server 220's switch off event for protected virtual machines. Detecting any event sent by a virtual machine management server may be based on having subscribed to specific events which correspond to protected virtual machines and are sent by the virtual machine management server. Detecting any event sent by a virtual machine management server may be based on having created an event trigger which monitors each specific event.

A switch off event can be an activity that removes something's electrical power. A virtual machine management server can be the hardware and/or software that controls and/or organizes software implementations of computers that executes programs like a physical computer. An event can be an activity. A protected virtual machine can be a software implementation of a computer that executes programs like a physical computer, and which is preserved from data loss. An event trigger can be a condition or action that activates a response.

After detecting a switch off event that is sent by a virtual machine management server, a virtual machine is identified as tagged by the switch off event and protected by a data protection server, block 304. The system identifies which virtual machine will be switched off. By way of example and without limitation, this can include the monitoring service 254 getting the tag XYZ, which is the name given to $2^{nd}$ virtual machine 234 on the $2^{nd}$ host 224, which is tagged by the switch off event and was configured via a Service Level Agreement to be protected by the backup/restore application 216 each Saturday night at midnight. Determining whether any event tags any virtual machines may be based on each protected virtual machine being tagged with a unique identifier. Any virtual machine being protected by a data protection server may be based on configuring a service level agreement and/or a policy to protect a corresponding virtual machine.

A virtual machine can be a software implementation of a computer that executes programs like a physical computer. A data protection server can be a computer and/or a program that creates a copy of computer data for other computers or programs, and stores the copy elsewhere so that the copy may be used to reinstate the original after a data loss. A unique identifier can be characters that distinguish a person, object, or data from others. A service level agreement may be a contract that outlines the support a provider will offer and the performance standards the support must meet. A policy can be a course or principle of action adopted or proposed by a business or individual.

Following the identification of a virtual machine as tagged by a switch off event and protected by a data protection server, a deletion lock is applied to the virtual machine that is tagged by the switch off event and is protected by the data protection server, block 306. The system temporarily prevents a virtual machine that will be switched off from being deleted. In embodiments, this can include the monitoring service 254 applying a deletion lock to the XYZ virtual machine 234. A deletion lock can be a mechanism that prevents removal of data from a computer's memory or storage.

Having applied a deletion lock to a virtual machine that is tagged by a switch off event and is protected by a data protection server, a deletion event is detected as being sent by a virtual machine management server, block 308. The system identifies a request to delete a virtual machine. For example, and without limitation, this can include the monitoring service 254 detecting a deletion event sent by the vCenter server 220 because the monitoring service 254 subscribes to an event trigger created for the deletion event sent by the vCenter server 220 for protected virtual machines, A deletion event can be an activity that removes data from a computer's memory or storage.

After detecting a deletion event is sent by a virtual machine management server, a virtual machine is identified as tagged by a switch off event, protected by a data protection server, and tagged by the deletion event, block 310. The system identifies a virtual machine that will be deleted. By way of example and without limitation, this can include the monitoring service 254 getting the tag XYZ for the $2^{nd}$ virtual machine 234 on the $2^{nd}$ host 224, which is tagged by the deletion event.

Following the identification of a virtual machine that is tagged by a switch off event, protected by a data protection server, and tagged by a deletion event, a backup file is created for the virtual machine that is tagged by the deletion event, block 312. The system creates a backup for a virtual machine that is to be deleted. In embodiments, this can include the monitoring service 254 initiating the backup/restore application 216 to create a backup file for the XYZ virtual machine 234 that is tagged by the deletion event, Creating a backup file for a virtual machine and/or restoring the virtual machine may be based on a backup and restore application, which is associated with a data protection server, performing at least one of creating the backup file for the virtual machine and restoring the virtual machine.

A backup file can be a copy of computer data taken and stored elsewhere so that the copy may be used to restore the original after a data loss. A backup and retore application can be a computer program that creates a copy of computer data for other programs or computers, and stores the copy elsewhere so that the copy may be used to reinstate the original after a data loss.

Having identified a virtual machine that is tagged by a switch off event, protected by a data protection server, and tagged by a deletion event, the deletion event is optionally identified to a data protection server and/or an administrator of a virtual machine management server, block 314. The system can generate an alert that informs computers and their users about a deletion event. For example, and without limitation, this can include the monitoring service 254 notifying the system administrator for the vCenter server 220 about the deletion event for the XYZ virtual machine 234. The system administrator may take appropriate action before the protected virtual machine is deleted. An administrator can be a person who is in charge of the operation of a network of computers, a website, and/or a group of computer users, etc., and is able to make changes to it.

After creating a backup file for a virtual machine that is tagged by a deletion event, a deletion lock is released from protecting the virtual machine that is tagged by the deletion event and the virtual machine is deleted, block 316. The system releases a virtual machine for deletion after the virtual machine has been backed up. By way of example and without limitation, this can include the monitoring service 254 releasing the deletion lock from protecting the XYZ virtual machine 234 that is tagged by a deletion event.

Following the release of a deletion lock from protecting a virtual machine that is tagged by a deletion event, if a determination is made that the deletion event was accidental or malicious, then a backup file is used to restore the virtual machine which was deleted by the deletion event after the release of the deletion lock, block 318. The system restores virtual machines that should not have been deleted to the state in which they were when they were deleted. In embodiments, this can include the monitoring system 246 determining that the deletion event was accidental, and then initiating the backup/restore application 216 to use the backup file created on Thursday night at midnight to restore the XYZ virtual machine 234 that was deleted on Thursday night at midnight after the release of the deletion lock to the state of the XYZ virtual machine 234 on Thursday night at midnight.

A determination can be the process of establishing something exactly by calculation or research. Accidental can be happening by chance, unintentionally, or unexpectedly. Malicious can be characterized by intending to do harm.

Although FIG. 3 depicts the blocks 302-318 occurring in a specific order, the blocks 302-318 may occur in another order. In other implementations, each of the blocks 302-318 may also be executed in combination with other blocks and/or some blocks may be divided into a different set of blocks.

Although the following paragraphs describe Dell Corporation's PowerProtect® backup/restore application, Dell Corporation's NetWorker® backup/restore application, and Dell Corporation's Avamar® backup/restore application as examples of the backup/restore application 216, the backup/restore application 216 may be another type of backup/restore application which provides the backup/restore functionalities described in the sections above. The data protection server 212 may be another type of backup server which provides the backup/restore functionalities described in the Background section.

The backup/restore application 216 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances.

When superior performance is crucial, PowerProtect® Data Manager provides a direct path between Dell tier one storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 216 may be a Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups.

The core NetWorker® software backs up client file systems and operating system environments. Add-on database and application modules provide backup services for products such as Microsoft® Exchange Server. Client backup data may be sent to a remote NetWorker® storage node or stored on a locally attached device using a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 216 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic.

Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types.

The backup/restore application 216 may use different policies for various data protection levels, such as a "gold" policy for VMware® clients, a "platinum" policy for UNIX® clients, and a "silver" policy for Windows® clients. The gold policy can specify to store two backup copies for each VMware® client's application resources onto the first disk for six months, store a primary clone of the backup copies onto the second disk for one year, and store a secondary clone of the backup copies onto a tape for five years. In another example, a policy can provide redundancy by specifying to replicate each full backup copy to three different backups servers, replicate each incremental cumulative backup copy and each incremental differential backup copy to two different data protection servers, replicate each archive log backup copy to an additional data protection server, and relocate each full backup copy created at the end of the month to cloud tiering for long term retention. Backup copies stored in the cloud tiering have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can include the target storage device where backup copies are stored.

Figure 4:
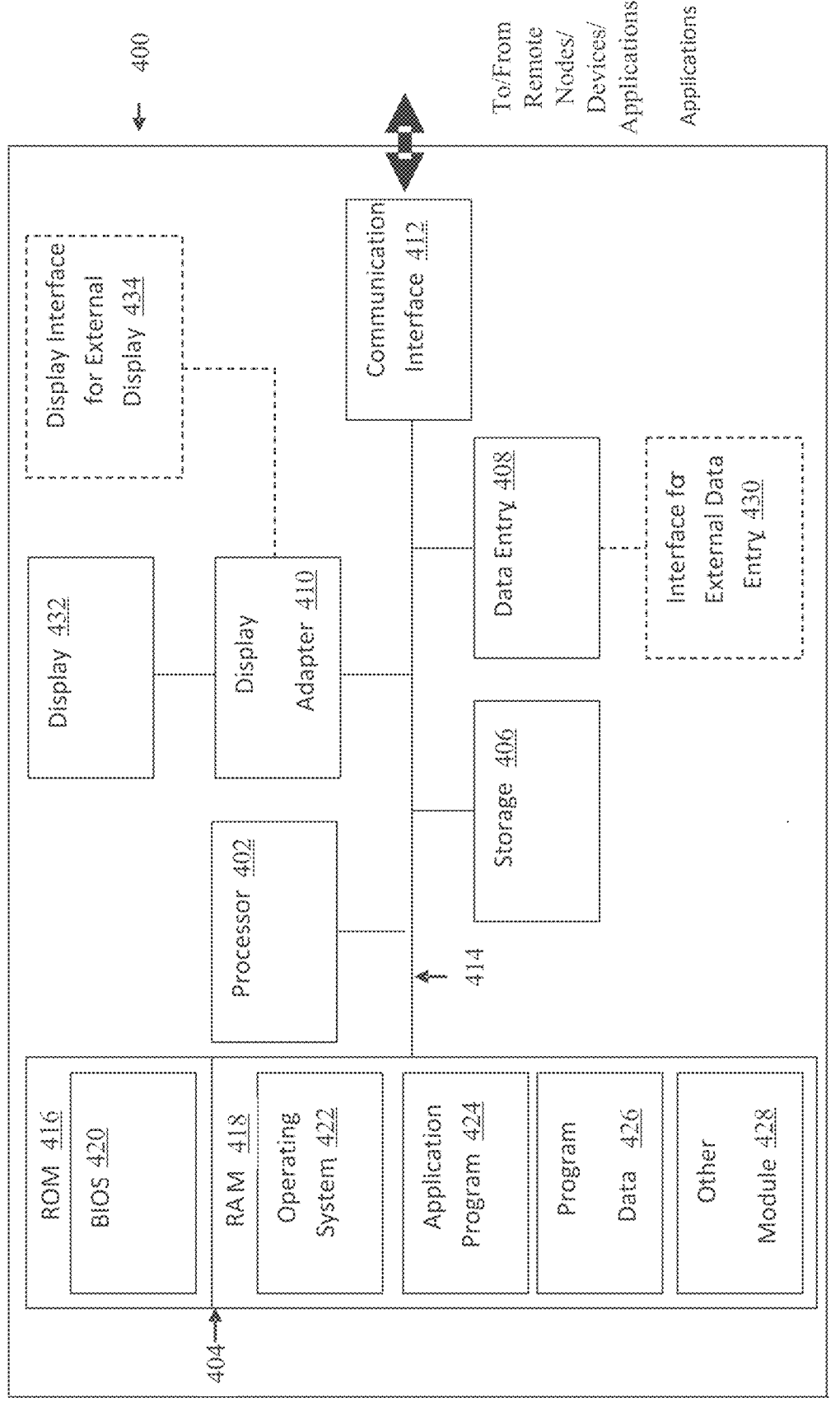
FIG. 4 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random-access memory (RAM) 418. The memory 404 may be configured to store program instructions and data during operation of the hardware device 400. In various embodiments, the memory 404 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 400. It is noted that the methods described herein may be embodied in executable instructions stored in a computer readable medium for use by or in connection with an instruction execution machine, apparatus, or device, such as a computer-based or processor-containing machine, apparatus, or device.

It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for conducting the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430.

By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device, or other common network node, and typically includes many or all the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

The arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for intelligent dynamic protection of deleted virtual machines, comprising:

one or more processors; and a non-transitory computer readable medium storing a plurality of instructions, which when executed, cause the one or more processors to:

identify a virtual machine that is tagged by a switch off event and is protected by a data protection server, in response to detecting the switch off event sent by a virtual machine management server;

apply a deletion lock to the virtual machine that is tagged by the switch off event and is protected by the data protection server;

identify a virtual machine that is tagged by the switch off event and is protected by the data protection server and is also tagged by a deletion event, in response to detecting the deletion event sent by the virtual machine management server;

create a backup file for the virtual machine that is tagged by the deletion event;

release the deletion lock from protecting the virtual machine that is tagged by the deletion event; and restore, using the backup file, the virtual machine, which was deleted by the deletion event after the release of the deletion lock, in response to a determination that the deletion event was one of accidental or malicious.

2. The system of claim 1, wherein detecting any event sent by the virtual machine management server is based on having subscribed to specific events which correspond to protected virtual machines and are sent by the virtual machine management server.

3. The system of claim 1, wherein detecting any event sent by the virtual machine management server is based on having created an event trigger which monitors each event.

4. The system of claim 1, wherein any event tagging any virtual machines is based on each protected virtual machine being tagged with a unique identifier.

5. The system of claim 1, wherein any virtual machine is protected by the data protection server based on configuring at least one of a service level agreement or a policy to protect a corresponding virtual machine.

6. The system of claim 1, wherein at least one of creating the backup file for the virtual machine and restoring the virtual machine is based on a backup and restore application, which is associated with the data protection server, performing at least one of creating the backup file for the virtual machine or restoring the virtual machine.

7. The system of claim 1, wherein the plurality of instructions, when executed, will further cause the one or more processors to identify the deletion event to at least one of the data protection server or an administrator of the virtual machine management server.

8. A computer-implemented method for intelligent dynamic protection of deleted virtual machines, comprising:

identifying a virtual machine that is tagged by a switch off event and is protected by a data protection server, in response to detecting the switch off event sent by a virtual machine management server;

applying a deletion lock to the virtual machine that is tagged by the switch off event and is protected by the data protection server;

identifying a virtual machine that is tagged by the switch off event and is protected by the data protection server and is also tagged by a deletion event, in response to detecting the deletion event sent by the virtual machine management server;

creating a backup file for the virtual machine that is tagged by the deletion event;

releasing the deletion lock from protecting the virtual machine that is tagged by the deletion event; and restoring, using the backup file, the virtual machine, which was deleted by the deletion event after the release of the deletion lock, in response to a determination that the deletion event was one of accidental or malicious.

9. The computer-implemented method of claim 8, wherein detecting any event sent by the virtual machine management server is based on having subscribed to specific events which correspond to protected virtual machines and are sent by the virtual machine management server.

10. The computer-implemented method of claim 8, wherein detecting any event sent by the virtual machine management server is based on having created an event trigger which monitors each event.

11. The computer-implemented method of claim 8, wherein any event tagging any virtual machines is based on each protected virtual machine being tagged with a unique identifier.

12. The computer-implemented method of claim 8, any virtual machine is protected by the data protection server based on configuring at least one of a service level agreement or a policy to protect a corresponding virtual machine.

13. The computer-implemented method of claim 8, wherein at least one of creating the backup file for the virtual machine and restoring the virtual machine is based on a backup and restore application, which is associated with the data protection server, performing at least one of creating the backup file for the virtual machine or restoring the virtual machine.

14. The computer-implemented method of claim 8, wherein the computer-implemented method further comprises identifying the deletion event to at least one of the data protection server or an administrator of the virtual machine management server.

15. A computer program product, comprising a non-transitory computer-readable medium having a computer-readable program code embodied therein to be executed by one or more processors, the program code including instructions to:

identify a virtual machine that is tagged by a switch off event and is protected by a data protection server, in response to detecting the switch off event sent by a virtual machine management server;

apply a deletion lock to the virtual machine that is tagged by the switch off event and is protected by the data protection server;

identify a virtual machine that is tagged by the switch off event and is protected by the data protection server and is also tagged by a deletion event, in response to detecting the deletion event sent by the virtual machine management server;

create a backup file for the virtual machine that is tagged by the deletion event;

release the deletion lock from protecting the virtual machine that is tagged by the deletion event; and restore, using the backup file, the virtual machine, which was deleted by the deletion event after the release of the deletion lock, in response to a determination that the deletion event was one of accidental or malicious.

16. The computer program product of claim 15, wherein detecting any event sent by the virtual machine management server is based on at last one of having subscribed to specific events which correspond to protected virtual machines and are sent by the virtual machine management server, or having created an event trigger which monitors each event.

17. The computer program product of claim 15, wherein any event tagging any virtual machines is based on each protected virtual machine being tagged with a unique identifier.

18. The computer program product of claim 15, any virtual machine is protected by the data protection server based on configuring at least one of a service level agreement or a policy to protect a corresponding virtual machine.

19. The computer program product of claim 15, wherein at least one of creating the backup file for the virtual machine and restoring the virtual machine is based on a backup and restore application, which is associated with the data protection server, performing at least one of creating the backup file for the virtual machine or restoring the virtual machine.

20. The computer program product of claim 15, wherein the program code includes further instructions to identify the deletion event to at least one of the data protection server or an administrator of the virtual machine management server.

* * * * *